United States Patent
Liu et al.

(10) Patent No.: US 11,199,265 B2
(45) Date of Patent: Dec. 14, 2021

(54) PIPE CONNECTION COMPENSATION DEVICE BY MAGNETIC FLUID SEALING

(71) Applicants: JIANGSU UNIVERSITY, Zhenjiang (CN); INSTITUTE OF FLUID ENGINEERING EQUIPMENT, JITRI, Zhenjiang (CN)

(72) Inventors: Houlin Liu, Zhenjiang (CN); Zilong Zhang, Zhenjiang (CN); Kaikai Luo, Zhenjiang (CN); Yong Wang, Zhenjiang (CN); Kai Wang, Zhenjiang (CN); Liang Dong, Zhenjiang (CN); Minggao Tan, Zhenjiang (CN)

(73) Assignees: JIANGSU UNIVERSITY, Zhenjiang (CN); INSTITUTE OF FLUID ENGINEERING EQUIPMENT, JITRI, Zhenjiang (CN)

( * ) Notice: Subject to any disclaimer, the term of this patent is extended or adjusted under 35 U.S.C. 154(b) by 407 days.

(21) Appl. No.: 16/466,900

(22) PCT Filed: Jun. 13, 2018

(86) PCT No.: PCT/CN2018/091049
§ 371 (c)(1),
(2) Date: Jun. 5, 2019

(87) PCT Pub. No.: WO2019/136923
PCT Pub. Date: Jul. 18, 2019

(65) Prior Publication Data
US 2021/0324958 A1    Oct. 21, 2021

(30) Foreign Application Priority Data

Jan. 15, 2018 (CN) .......................... 201810034518.5
May 9, 2018 (CN) .......................... 201810439429.9

(51) Int. Cl.
*F16J 15/43* (2006.01)
*F16L 51/00* (2006.01)
*F16L 27/12* (2006.01)

(52) U.S. Cl.
CPC .............. *F16J 15/43* (2013.01); *F16L 27/12* (2013.01); *F16L 51/00* (2013.01)

(58) Field of Classification Search
CPC ... F16L 27/12; F16L 27/127; F16L 27/12751; F16L 51/00; F16L 37/004; F16J 15/43
See application file for complete search history.

(56) References Cited

U.S. PATENT DOCUMENTS 3,612,549 A     10/1971  Berkowitz
4,317,586 A  *   3/1982  Campbell ............. F16L 27/125
                                            285/95

(Continued)

FOREIGN PATENT DOCUMENTS

CN        2373673 Y  *  4/2000
CN       201964080 U     9/2011

(Continued)

*Primary Examiner* — Matthew Troutman
*Assistant Examiner* — Alexander T Rufrano
(74) *Attorney, Agent, or Firm* — Heslin Rothenberg Farley & Mesiti. P.C.

(57) ABSTRACT

A pipe connection compensation device by magnetic fluid sealing comprising a compensation pipe, sealed end cap, coil, annular permanent magnet and tightening rod is provided, designed and configured in a novel manner to ensure the pipe connection compensation device by magnetic fluid sealing achieves a better sealing effect.

8 Claims, 3 Drawing Sheets

(56) References Cited

U.S. PATENT DOCUMENTS

| | | | | |
|---|---|---|---|---|
| 5,799,702 | A * | 9/1998 | Hsien-Jen | F16L 27/12751 |
| | | | | 138/120 |
| 5,828,795 | A * | 10/1998 | Miyakoshi | F16C 33/765 |
| | | | | 384/133 |
| 6,769,694 | B2 * | 8/2004 | Anzai | F16J 15/43 |
| | | | | 277/410 |
| 7,252,112 | B1 * | 8/2007 | Imler | F16L 37/004 |
| | | | | 137/614.04 |
| 9,604,838 | B2 * | 3/2017 | Cornett | B67D 7/04 |
| 10,378,587 | B2 * | 8/2019 | Sato | F16C 37/007 |
| 2007/0236828 | A1 * | 10/2007 | Mikhalev | F16J 15/43 |
| | | | | 360/97.19 |
| 2016/0003389 | A1 | 1/2016 | Nagao | |

FOREIGN PATENT DOCUMENTS

| | | | | |
|---|---|---|---|---|
| CN | 104896248 A | | 9/2015 | |
| CN | 104995444 A | | 10/2015 | |
| CN | 108331990 A | | 7/2018 | |
| DE | 19937873 A1 * | | 3/2001 | F16J 15/43 |
| GB | 2302921 A * | | 2/1997 | F16J 15/4474 |
| JP | 2586305 Y2 * | | 12/1998 | H02K 5/124 |
| SU | 956896 A1 | | 9/1982 | |

* cited by examiner

PIPE CONNECTION COMPENSATION DEVICE BY MAGNETIC FLUID SEALING

CROSS REFERENCE TO RELATED APPLICATIONS

This application is a U.S. National Phase filing under 35 U.S.C. § 371 of International Application PCT/CN2018/091049, filed Jun. 13, 2018. PCT/CN2018/091049 claims priority from Chinese Patent Application Number 201810439429.9, filed May 8, 2018, and Chinese Application Number 201810034518.5, filed Jan. 15, 2018. The entire contents of each of these applications are hereby expressly incorporated herein by reference.

TECHNICAL FIELD

The present invention relates to the field of magnetic fluids, and in particular to a pipe connection compensation device by magnetic fluid sealing.

TECHNICAL BACKGROUND

Axial compensation device by magnetic fluid seal disclosed in Chinese patent application 201810034518.5 adopts a newly designed telescopic structure according to the principle of magnetic fluid sealing, and invents an axial compensation device by magnetic fluid seal, which has the characteristics of simple structure, easy installation and easy disassembly etc. However, it does not give the design method of each parts.

SUMMARY OF THE INVENTION

In view of the deficiencies of the prior art, the present invention provides a pipe connection compensation device by magnetic fluid sealing. According to different types of pipelines and different working pressures in actual engineering, the invention designs various components of the pipe connection compensation device by magnetic fluid sealing and gives a relationship with each other to ensure that the device can well seal the gap due to axial deformation and circumferential rotation of the pipeline systems and the like, ensuring that the pipe connection compensation device by magnetic fluid sealing well satisfies the sealing effect.

The present invention achieves the above technical objects by the following technical means.

A pipe connection compensation device by magnetic fluid sealing comprises a first flange pipe and a second flange pipe, the second flange pipe comprises a second flange plate and a second joint pipe, the second flange plate is concentrically welded and fixed to the second joint pipe; the first flange pipe comprises a first flange plate, a first joint pipe and a flange ring, the first flange plate and the flange ring are welded and fixed via the first joint pipe; the pipe connection compensation device by magnetic fluid sealing further comprises a connection compensation device, the connection compensation device comprises a compensation pipe, a sealed end cap, a coil, an annular permanent magnet and a tightening rod; one end of the compensation pipe is connected to the flange ring, the other end of the compensation pipe is connected to the sealed end cap, and the second joint pipe penetrates into the sealed end cap; the sealed end cap fits with the second joint pipe in clearance fit; an inner wall of the sealed end cap is provided with a first annular liquid storage groove and a second annular liquid storage groove, the outer wall of the sealed end cap is provided with a first annular groove and a second annular groove, which are arranged axially; the coil is wound around the first annular groove, and the annular permanent magnet is installed in the second annular groove; the radial gap between the sealed end cap and the second joint pipe, the first annular liquid storage groove, the second annular liquid storage groove, and the radial gap between the compensation pipe and the sealed end cap form a gap chamber, which is filled with the magnetic fluid; the first flange pipe and the second flange pipe are connected via the tightening rod; one end of the tightening rod fixes the first flange pipe through nuts, and the other end of the tightening rod is provided with the limit nuts for limiting the axial limit position of the second flange pipe.

Further, one end face of the second annular groove is on the same normal plane with one end face of the first annular liquid storage groove.

Further, the first annular groove is located between the first annular liquid storage groove and the second annular liquid storage groove.

Further, the sealed end cap is provided with a filling hole, and the filling hole is in communication with the gap chamber.

Further, the outer ring of the second joint pipe inserted into the sealed end cap is provided with a liquid storage groove.

Further, the nominal diameter of the second joint pipe and the first joint pipe are both d0; the wall thickness of the second joint pipe is $\delta_1$, the wall thickness of the first joint pipe is $\delta_2$, and the determining equation of the wall thickness $\delta_1$ of the second joint pipe is:

$$\delta_1 = \frac{P_0 D_0}{2[\delta]^t E_j},$$

when $\delta_1 \leq 4$ mm, $\delta_1 = 4$ mm
Where,
  $d_0$—Nominal diameter of the second joint pipe, mm;
  $P_0$—Design pressure of fluid in the pipeline, Mpa;
  $D_0$—The outer diameter of the second joint pipe, $D_0 = d_0 + 2\delta_1$, mm;
  $[\delta]^t$—Material allowable stress of the second joint pipe, Mpa;
  $E_j$—Welded joint coefficient of the second joint pipe;
The wall thickness $\delta_2$ of the first joint pipe is not less than the wall thickness $\delta_1$ of the second joint pipe.

Further, the number of turns N and the current I of the coil should satisfy the following equation:

$$IN \geq \frac{P_0 L_{41}[(d_0 + 2\delta_1 + 2\varepsilon)^2 - (d_0 + 2\delta_1)^2]}{10^6 \zeta B d_{41}}$$

Where,
  $P_0$—Design pressure of fluid in the pipeline, Mpa;
  $\zeta$—Safety factor, 0.8~0.9;
  B—Magnetic field strength in the coil generated by the magnetic fluid, A/s;
  I—Current in the coil, A;
  N—Number of turns of the coil;
  $L_{41}$—Width of the coil, $L_{41} = 9\delta_1$, mm;
  $d_{41}$—Inner diameter of the sealed end cap, $d_{41} = 2\delta_1 + d_0 + 2\varepsilon$, mm;
  $\varepsilon$—Radial clearance between the second joint pipe and the sealed end cap, $\varepsilon = 0.02 d_0$, mm.

Further, the cross-sectional width H of the annular permanent magnet should satisfy the following equation:

$$\rho_1 L_{410} H K_4 C_4 > 4\rho_2 L_{411} L_{48}$$

Where, $\rho_1$—Density of the annular permanent magnet, kg/m³;

$K_4$—Safety factor of the annular permanent magnet, 0.6~0.8;

H—Cross-sectional width of the annular permanent magnet, mm;

$L_{410}$—Cross-sectional length of the annular permanent magnet, $L_{410}=\delta_1$, mm;

$L_{411}$—Cross-sectional width of the first annular liquid storage groove, $L_{411}=\delta_1$, mm;

$L_{48}$—Length of the annular permanent magnet, $L_{48}=1.2\delta_1$, mm;

$\rho_2$—Density of the magnetic fluid, kg/m³;

$C_4$—Residual magnetic coefficient of the annular permanent magnet.

The beneficial effects of the present invention are:

1. The pipe connection compensation device by magnetic fluid sealing of the present invention adopts the principle of magnetic fluid sealing to design the structure of the compensation device to ensure that it has a good axial compensation effect for the pipeline expansion, axial and radial deformation under high-pressure working conditions. The present invention ensures its adaptability to the deformation of the pipeline and ensures more efficient and stable operation of the fluid pipelines.

2. The pipe connection compensation device by magnetic fluid sealing of the present invention, the outer ring of the second joint pipe inserted into the sealed end cap is provided with a liquid storage groove, which increases the liquid storage capacity and the friction force of the liquid storage medium in the flow, ensuring the sealing effect.

3. According to different types of pipelines and working pressures in actual engineering, the pipe connection compensation device by magnetic fluid sealing of the present invention designs various components in the device and gives a relationship with each other to ensure that the device can seal well the gap generated due to axial deformation of the pipeline systems, circumferential rotation and the like, ensuring that the pipe connection compensation device by magnetic fluid sealing well satisfies the sealing effect.

Figure 1:
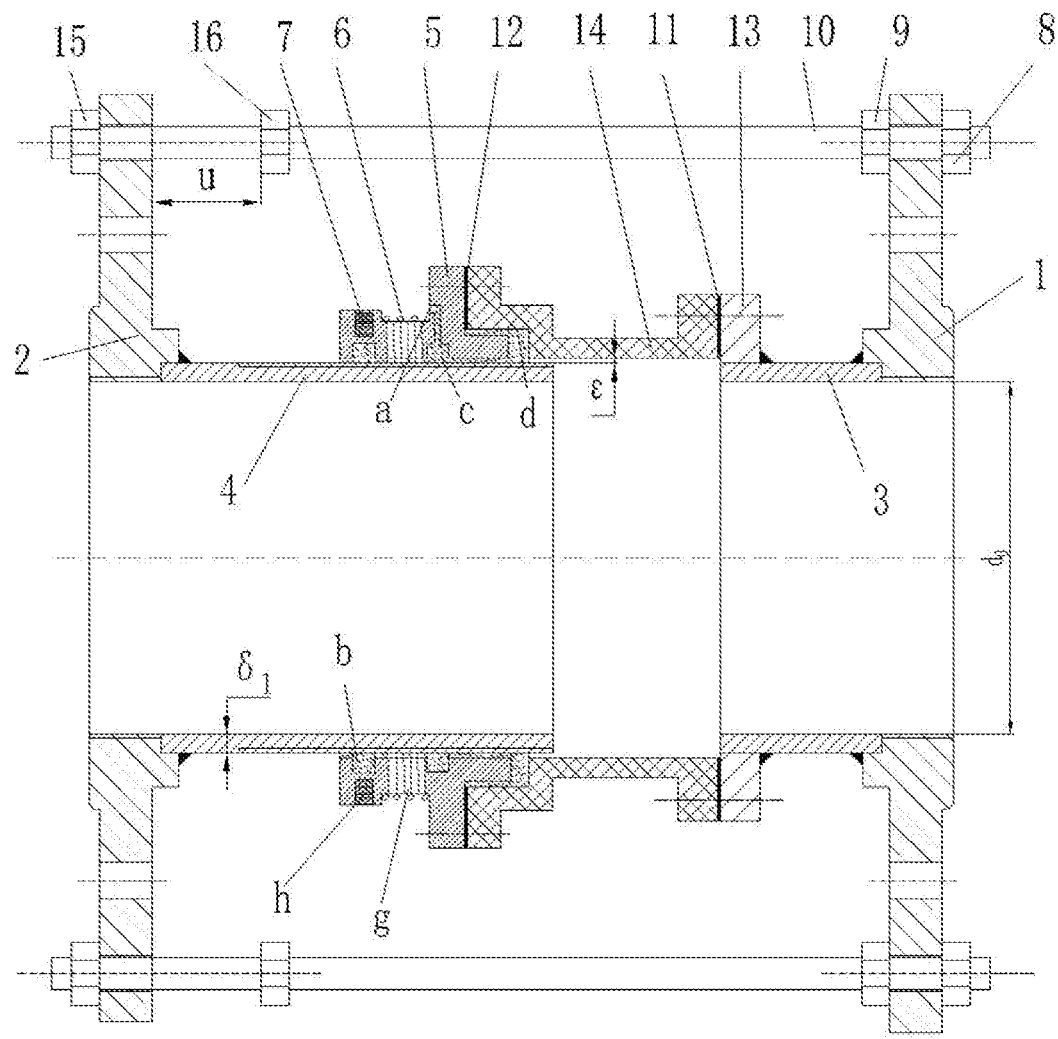
FIG. 1 is the structural view of the pipe connection compensation device by magnetic fluid sealing according to the present invention.

In the drawings: 1—the first flange plate; 2—the second flange plate; 3—the first joint pipe; 4—the second joint pipe; 5—the sealed end cap; 6—the coil; 7—the annular permanent magnet; 8—the first nut; 9—the second nut; 10—the tightening rod; 11—the first sealing gasket; 12—the second sealing gasket; 13—the flange ring; 14—the compensation pipe; 15—the first limit nut; 16—the second limit nut; a—filling hole; b—the first annular liquid storage groove; c—the second annular liquid storage groove; d—the magnetic fluid; g—the first annular groove; h—the second annular groove.

EMBODIMENTS

Hereunder the invention will be further detailed in combination with the following drawings and specific embodiments, but the protection scope of the present invention is not limited thereto.

Figure 2:
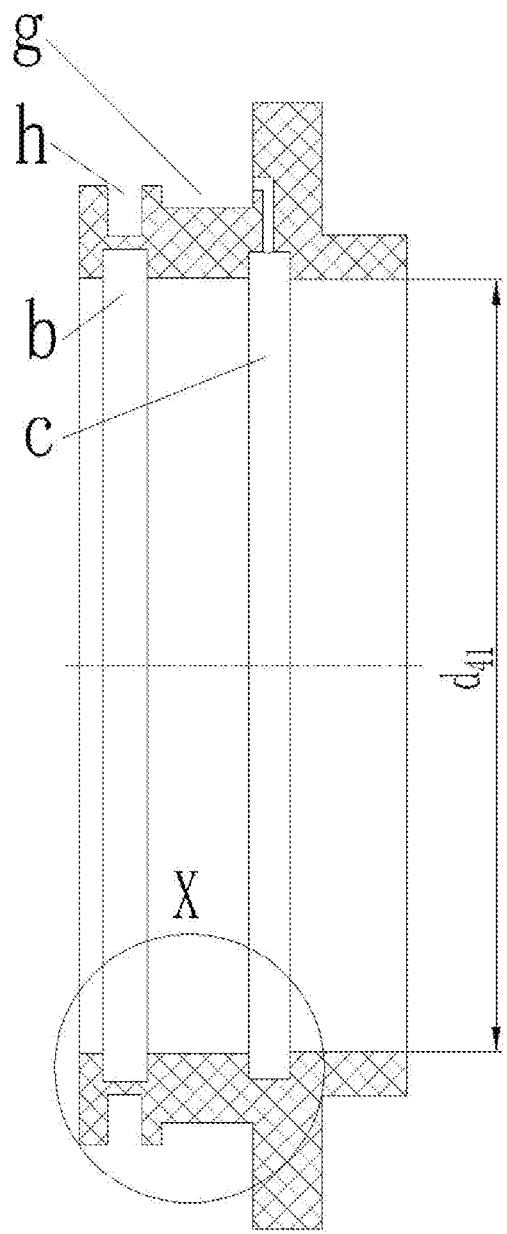
FIG. 2 is a profile drawing of the sealed end cap according to the present invention.
Figure 3:
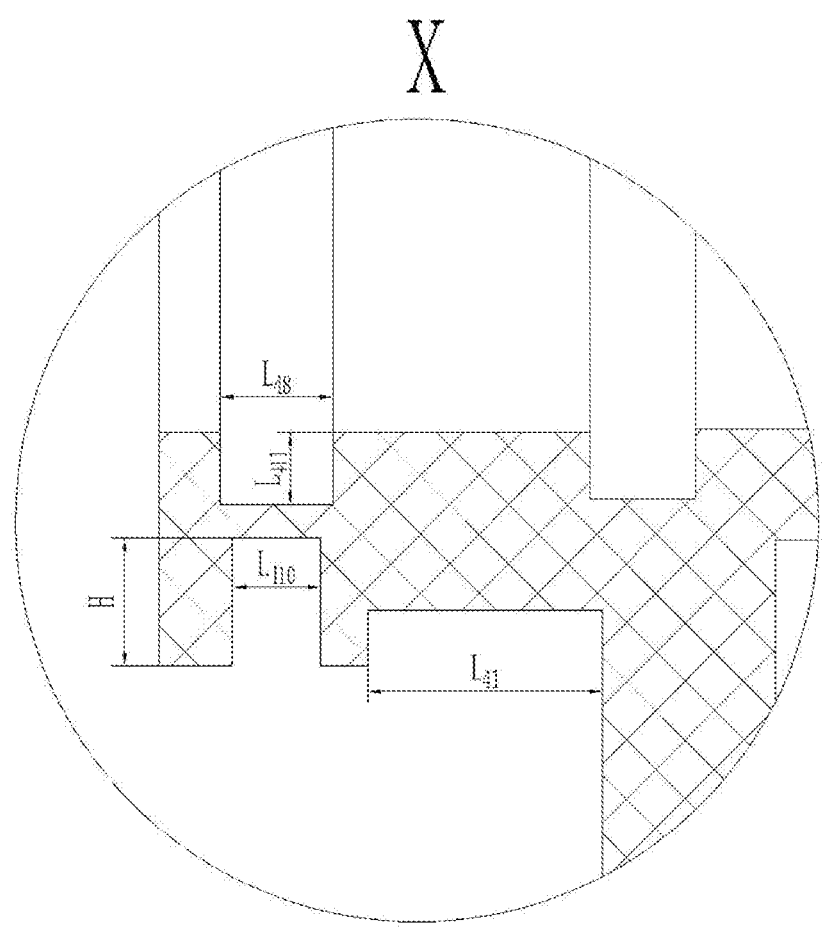
FIG. 3 is a partial enlarged view of the sealed end cap of FIG. 2.

As shown in FIG. 1 and FIG. 2, the pipe connection compensation device by magnetic fluid sealing comprises a first flange pipe and a second flange pipe and a connection compensation device, the second flange pipe comprises a second flange plate 2 and a second joint pipe 4, the second flange plate 2 is concentrically welded and fixed to the second joint pipe 4; the first flange pipe comprises a first flange plate 1, a first joint pipe 3 and the flange ring 13, the first flange plate 1 and the flange ring 13 are welded and fixed via the first joint pipe 3.

The connection compensation device comprises the compensation pipe 14, the sealed end cap 5, the coil 6, the annular permanent magnet 7 and the tightening rod 10; one end of the compensation pipe 14 is connected to the flange ring 13, the other end of the compensation pipe 14 is connected to the sealed end cap 5, and the second joint pipe 4 penetrates into the sealed end cap 5; the sealed end cap 5 fit the second joint pipe 4 in clearance; an inner wall of the sealed end cap 5 is provided with a first annular liquid storage groove b and a second annular liquid storage groove c, the outer wall of the sealed end cap 5 is provided with a first annular groove g and a second annular groove h, which are axially arranged; the coil 6 is wound around the first annular groove g, and the annular permanent magnet 7 is installed in the second annular groove h; the radial gap between the sealed end cap 5 and the second joint pipe 4, the first annular liquid storage groove b, the second annular liquid storage groove c, and the radial gap between the compensation pipe 14 and the sealed end cap 5 form a gap chamber, which is filled with the magnetic fluid d; the first flange pipe and the second flange pipe are connected via the tightening rod 10; one end of the tightening rod 10 is locked and fixed to the first flange plate 1 by the first nut 8 and the second nut 9, the other end of the tightening rod 10 is provided with the first limit nut 15 and the second limit nut 16; the second flange plate 2 is limited between the first limit nut 15 and the second limit nut 16 for limiting the position of the axial movement of the second flange pipe. It can be seen from FIG. 1 that the maximum movement position of the second flange plate 2 is at the first limit nut 15, and the minimum movement position of the second flange plate 2 is at the second limit nut 16. It can be seen from figure that the movement distance of the second flange plate 2 is u.

One end face of the second annular groove h is on the same normal plane as one end face of the first annular liquid storage groove b; the first annular groove g is located between the first annular liquid storage groove b and the second annular liquid storage groove c; the sealed end cap 5 is provided with a filling hole a, and the filling hole a is in communication with the gap chamber, the magnetic fluid d can be replenished into the gap chamber through the filling hole a; when the magnetic fluid d is replenished, the filing hole a is closed by the screw; due to the action of the magnetic field of the annular permanent magnet 7 on the sealed end cap 5, the magnetic fluid d is filled in the gap chamber to achieve a good sealing effect; when the pressure in the pipeline is large, the coil 6 is supplied with alternating current to enhance the magnetic field at the sealed end cap 5 to ensure that the magnetic fluid d does not overflow; and at the same time, the first limiting nut 15 and the second limiting nut 16 define the axial position of the second flange plate 2, making the present invention well perform axial compensation for the expansion and contraction of the pipeline, and axial deformation, etc.

The outer ring of the second joint pipe 4 inserted into the sealed end cap 5 is provided with a liquid storage groove, and the liquid storage groove is a helical groove, which increases the liquid storage capacity and the friction force of the liquid storage medium in the flow, ensuring the sealing effect.

The material for the first joint pipe 3, the second joint pipe 4, the first nut 8, the second nut 9, the tightening rod 10, the flange ring 13, the compensation pipe 14, the first limiting nut 15, the second limiting nut 16 is stainless steel or high-quality structural steel, and the sealed end cap 5 is made of magnetic conductive metal material.

The nominal diameter of the second joint pipe 4 and the first joint pipe 3 are both d0; the wall thickness of the second joint pipe 4 is $\delta_1$, the wall thickness of the first joint pipe 3 is $\delta_2$, and the determining equation of the wall thickness $\delta_1$ of the second joint pipe 4 is:

$$\delta_1 = \frac{P_0 D_0}{2[\delta]^t E_j},$$

when $\delta_1 \leq 4$ mm, $\delta_1 = 4$ mm
Where,
$d_0$—Nominal diameter of the second joint pipe 4, mm;
$P_0$—Design pressure of fluid in the pipeline, Mpa;
$D_0$—The outer diameter of the second joint pipe 4, $D_0 = d_0 + 2\delta_1$, mm;
$[\delta]^t$—Material allowable stress of the second joint pipe 4, Mpa;
$E_j$—Welded joint coefficient of the second joint pipe 4;
The wall thickness $\delta_2$ of the first joint pipe 3 is not less than the wall thickness $\delta_1$ of the second joint pipe 4.

The number of turns N and the current I of the coil 6 should satisfy the following equation:

$$IN \geq \frac{P_0 L_{41}[(d_0 + 2\delta_1 + 2\varepsilon)^2 - (d_0 + 2\delta_1)^2]}{10^6 \zeta B d_{41}}$$

Where,
$P_0$—Design pressure of fluid in the pipeline, Mpa;
$\zeta$—Safety factor, 0.8~0.9;
B—Magnetic field strength in the coil generated by the magnetic fluid d, A/s;
I—Current in the coil 6, A;
N—Number of turns of the coil 6;
$L_{41}$—Width of the coil 6, $L_{41} = 9\delta_1$, mm;
$d_{41}$—Inner diameter of the sealed end cap 5, $d_{41} = 2\delta_1 + d_0 + 2\varepsilon$, mm;
$\varepsilon$—Radial clearance between the second joint pipe 4 and the sealed end cap 5, $\varepsilon = 0.02$ $d_0$, mm.

The cross-sectional width H of the annular permanent magnet 7 should satisfy the following equation:

$$\rho_1 L_{410} H K_4 C_4 > 4\rho_2 L_{411} L_{48}$$

Where,
$\rho_1$—Density of the annular permanent magnet 7, kg/m³;
$K_4$—Safety factor of the annular permanent magnet 7, 0.6~0.8;
H—Cross-sectional width of the annular permanent magnet 7, mm;

$L_{410}$—Cross-sectional length of the annular permanent magnet 7, $L_{410} = \delta_1$, mm;
$L_{411}$—Cross-sectional width of the first annular liquid storage groove b, $L_{411} = \delta_1$, mm;
$L_{48}$—Length of the annular permanent magnet 7, $L_{48} = 1.2\delta_1$, mm;
$\rho_2$—Density of the magnetic fluid d, kg/m³;
$C_4$—Residual magnetic coefficient of the annular permanent magnet 7.

EXAMPLE

Taking a certain clean water transport pipeline as an example, the inner diameter of the pipeline is 50 mm and design inner pressure $P_0$ is 4 MPa. The pipeline uses flange joints. The nominal diameter do of the second joint pipe (4) and the first joint pipe (3) are both 50 mm. The first joint pipe (3) and the second joint pipe (4) are made of material Q345D, and the allowable stress of the material $[\delta]^\tau$ is 174 MPa; according to the Chinese standard "Steel Pressure Vessel" GB150-1998, the welded joint coefficient $E_1$ of the first joint pipe (3) and the second joint pipe (4) is 0.9. The calculation function of wall thickness $\delta_1$ of the second joint pipe 4 is:

$$\delta_1 = \frac{P_0 D_0}{2[\delta]^t E_j}$$

Where,
$d_0$—Nominal diameter of the second joint pipe 4, mm;
$P_0$—Design pressure of fluid in the pipeline, Mpa;
$D_0$—The outer diameter of the second joint pipe 4, $D_0 = d_0 + 2\delta_1$, mm;
$[\delta]^t$—Material allowable stress of the second joint pipe 4, Mpa;
$E_j$—Welded joint coefficient of the second joint pipe 4;
The wall thickness $\delta_1$ of the second joint pipe 4 calculated by the above formula is 0.65 mm, since $\delta_1 \leq 4$ mm, $\delta_1 = 4$ mm. $\delta_2$ is also 4 mm.

The number of turns N and the current I of the coil 6 should satisfy the following equation:

$$IN \geq \frac{P_0 L_{41}[(d_0 + 2\delta_1 + 2\varepsilon)^2 - (d_0 + 2\delta_1)^2]}{10^6 \zeta B d_{41}}$$

Where,
$P_0$—Design pressure of fluid in the pipeline, Mpa;
$\zeta$—Safety factor, 0.8~0.9;
B—Magnetic field strength in the coil 6 generated by the magnetic fluid d, A/s;
I—Current in the coil 6, A;
N—Number of turns of the coil 6;
$L_{41}$ Width of the coil 6, $L_{41} = 9\delta_1$, mm;
$d_{41}$ Inner diameter of the sealed end cap 5, $d_{41} = 26; + d_0 + 2\varepsilon$, mm;
$\varepsilon$—Radial clearance between the second joint pipe 4 and the sealed end cap 5, $\varepsilon = 0.02$ $d_0$, mm.

The magnetic field strength B in the coil 6 generated by the magnetic fluid d is 10 A/s. The safety factor $\zeta$ is 0.8, $d_{41} = 60$ mm, $L_{41} = 36$ mm. The number of turns N and the current I of the coil 6 should satisfy the following equation:

$$IN \geq 3.752 \times 10^5 (A)$$

The cross-sectional width H of the annular permanent magnet 7 should satisfy the following equation:

$$\rho_1{}^L{}_{410}HK_4C_4 > 4\rho_2 L_{411}L_{48}$$

Where, $\rho_1$—Density of the annular permanent magnet 7, kg/m³;
$K_4$—Safety factor of the annular permanent magnet 7, 0.6~0.8;
H—Cross-sectional width of the annular permanent magnet 7, mm;
$L_{410}$—Cross-sectional length of the annular permanent magnet 7, $L_{410}=\delta_1$, mm;
$L_{411}$—Cross-sectional width of the first annular liquid storage groove b, $L_{411}=\delta_1$, mm;
$L_{48}$—Length of the annular permanent magnet 7, $L_{48}=1.2\delta_1$, mm;
$\rho_2$—Density of the magnetic fluid d, kg/m³;
$C_4$—Residual magnetic coefficient of the annular permanent magnet 7.

The material of the annular permanent magnet 7 is sintered NdFeB magnet, its density $\rho_1$ is 7500 kg/m³. The material of the sealed end cap 5 is Water-based magnetic fluid MeFe₂O₄, its density $\rho_2$ is 3000 kg/m³. The safety factor $K_4$ of the annular permanent magnet is 0.6, and residual magnetic coefficient $C_4$ of the annular permanent magnet 7 is 12; $L_{48}=4.8$ mm, $L_{410}=4$ mm, $L_{411}=4$ mm. The cross-sectional width H of the annular permanent magnet 7 of the device should satisfy the following equation:

$$7500 \times H \times 0.6 \times 4 > 4 \times 3000 \times 4 \times 4.8$$

which is: H>4.27 mm. H is determined to be 4.5 mm.

The embodiment is a preferred embodiment of the present invention, but the present invention is not limited to the embodiment described above. Any obvious modifications, substitutions or variations that can be made by those skilled in the art are intended to be within the scope of the present invention without departing from the spirit of the present invention.

The invention claimed is:

1. A pipe connection compensation device by magnetic fluid sealing comprises a first flange pipe and a second flange pipe, the second flange pipe comprises the second flange plate and the second joint pipe, the second flange plate is concentrically welded and fixed to the second joint pipe; the first flange pipe comprises a first flange plate, a first joint pipe and a flange ring, the first flange plate and the flange ring are welded and fixed via the first joint pipe; wherein the pipe connection compensation device by magnetic fluid sealing further comprises a connection compensation device, the connection compensation device comprises a compensation pipe, a sealed end cap, a coil, an annular permanent magnet and a tightening rod; one end of the compensation pipe is connected to the flange ring, the other end of the compensation pipe is connected to the sealed end cap, and the second joint pipe penetrates into the sealed end cap; the sealed end cap fits with the second joint pipe in clearance fit; an inner wall of the sealed end cap is provided with a first annular liquid storage groove and a second annular liquid storage groove, the outer wall of the sealed end cap is provided with the a first annular groove and a second annular groove, which are axially arranged; the coil is wound around the first annular groove, and the annular permanent magnet is installed in the second annular groove; the radial gap between the sealed end cap and the second joint pipe, the first annular liquid storage groove, the second annular liquid storage groove, and a radial gap between the compensation pipe and the sealed end cap form a gap chamber, which is filled with the magnetic fluid; the first flange pipe and the second flange pipe are connected via the tightening rod; one end of the tightening rod fixes the first flange tube through fastening nuts, and the other end of the tightening rod is provided with the limiting nuts for limiting the axial limit position of the second flange pipe.

2. The pipe connection compensation device by magnetic fluid sealing according to claim 1, wherein, one end face of the second annular groove is on the same normal plane as one end face of the first annular liquid storage groove.

3. The pipe connection compensation device by magnetic fluid sealing according to claim 1, wherein, the first annular groove is located between the first annular liquid storage groove and the second annular liquid storage groove.

4. The pipe connection compensation device by magnetic fluid sealing according to claim 1, wherein, the sealed end cap is provided with a filling hole and the filling hole is in communication with the gap chamber.

5. The pipe connection compensation device by magnetic fluid sealing according to claim 1, wherein, the outer ring of the second joint pipe inserted into the sealed end cap is provided with a liquid storage groove.

6. The pipe connection compensation device by magnetic fluid sealing according to claim 1, wherein, the nominal diameter of the second joint pipe and the first joint pipe are both $d_0$; the wall thickness of the second joint pipe is $\delta_1$, the wall thickness of the first joint pipe is $\delta_2$, wherein, the determining equation of the wall thickness $\delta_1$ of the second joint pipe is:

$$\delta_1 = \frac{P_0 D_0}{2[\delta]^t E_j},$$

when $\delta_1 \leq 4$ mm, $\delta_1 = 4$ mm

Where, $d_0$—Nominal diameter of the second joint pipe, mm;
$P_0$—Design pressure of fluid in the pipeline, Mpa;
$D_0$—The outer diameter of the second joint pipe, $D_0=d_0+2\delta_1$, mm;
$[\delta]^t$—Material allowable stress of the second joint pipe, Mpa;
$E_j$—Welded joint coefficient of the second joint pipe;
the wall thickness $\delta_2$ of the first joint pipe is not less than the wall thickness $\delta_1$ of the second joint pipe.

7. The pipe connection compensation device by magnetic fluid sealing according to claim 1, wherein, the number of turns N and the current I of the coil should satisfy the following equation:

$$IN \geq \frac{P_0 L_{41}[(d_0+2\delta_1+2\varepsilon)^2 - (d_0+2\delta_1)^2]}{10^6 \zeta B d_{41}}$$

Where, $P_0$—Design pressure of fluid in the pipeline, Mpa;
$\zeta$—Safety factor, 0.8~0.9;
B—Magnetic field strength in the coil generated by the magnetic fluid, A/s;
I—Current in the coil, A;
N—Number of turns of the coil;
$L_{41}$—Width of the coil, $L_{41}=9\delta_1$, mm;
$d_{41}$—Inner diameter of the sealed end cap, $d_{41}=2\delta_1+d_0+2\varepsilon$, mm;

ε—Radial clearance between the second joint pipe and the sealed end cap, $\varepsilon=0.02\ d_0$, mm.

8. The pipe connection compensation device by magnetic fluid sealing according to claim 1, wherein, the cross-sectional width H of the annular permanent magnet should satisfy the following equation:

$$\rho_1 L_{410} H K_4 C_4 > 4\rho_2 L_{411} L_{48}$$

Where,
- $\rho_1$—Density of the annular permanent magnet, kg/m³;
- $K_4$—Safety factor of the annular permanent magnet, 0.6~0.8;
- H—Cross-sectional width of the annular permanent magnet, mm;
- $L_{410}$—Cross-sectional length of the annular permanent magnet, $L_{410}=\delta_1$, mm;
- $L_{411}$—Cross-sectional width of the annular liquid storage groove, $L_{411}=\delta_1$, mm;
- $L_{48}$—Length of the annular permanent magnet, $L_{48}=1.2\delta_1$, mm;
- $\rho_2$—Density of the magnetic fluid, kg/m³;
- $C_4$—Residual magnetic coefficient of the annular permanent magnet.

\* \* \* \* \*